(12) United States Patent
Verma et al.

(10) Patent No.: US 6,853,632 B1
(45) Date of Patent: Feb. 8, 2005

(54) TECHNIQUE FOR PEAK POWER TO AVERAGE POWER RATIO REDUCTION IN MULTICARRIER COMMUNICATION SYSTEMS

(76) Inventors: Amit Verma, 2, Bay View (North Wing), 15-A Ridge Road, Malabar Hill, Mumbai (IN), 400006; Mandayam T. Arvind, 107, Model House $4^{th}$ Street, Basavanagudi, Bangalore (IN)

(*) Notice: Subject to any disclaimer, the term of this patent is extended or adjusted under 35 U.S.C. 154(b) by 0 days.

(21) Appl. No.: 09/401,074

(22) Filed: Sep. 22, 1999

Related U.S. Application Data

(60) Provisional application No. 60/101,744, filed on Sep. 24, 1998.

(51) Int. Cl.[7] ................................................. H04B 1/10
(52) U.S. Cl. ...................................... 370/343; 370/482
(58) Field of Search ................................. 370/203, 204, 370/206, 208–210, 335, 342–344, 482; 375/200, 271, 295–298, 279, 316

(56) References Cited

U.S. PATENT DOCUMENTS

| | | | |
|---|---|---|---|
| 5,796,722 A | * 8/1998 | Kotzin et al. ............... | 370/252 |
| 5,835,536 A | * 11/1998 | May et al. .................... | 375/260 |
| 6,021,119 A | * 2/2000 | Derks et al. ................. | 370/261 |
| 6,175,551 B1 | * 1/2001 | Awater et al. .............. | 370/210 |
| 6,314,146 B1 | * 11/2001 | Tellado et al. .............. | 375/346 |
| 6,424,681 B1 | * 7/2002 | Tellado et al. | |

OTHER PUBLICATIONS

Bingham, "Multicarrier Modulation for Data Transmission," IEEE Comm., vol. 28, No. 5, pp. 5–14, 5/90.
Tellado & Cioffi, "PAR Reduction in Multicarrier Transmission Systems," TIE1.4/97–367, Dec. 8, 1997.
Tellado & Cioffi, Revisiting DMT's PAR (98–083), T1E1. 4/98–083. Mar 3, 1998.
ITU Study Group 15, "A New Approach to PAR Control in DMT Systems," NF–83, May 11–14, 1998.
ITU Study Group 15, "An Efficient Implementation of PAR reduction method," Aug. 3–7, 1998.
Jones, Wilkinson & Barton, "Block Coding Scheme for Reduction of Peak to Mean Envelope Power Ratio".

* cited by examiner

Primary Examiner—Huy D. Vu
Assistant Examiner—Daniel J. Ryman

(57) ABSTRACT

A gradient sensitivity based method is described for reducing Peak to Average Power Ratio in multicarrier communication systems. The method involves definition of a differentiable penalty function which has non-zero values whenever there is a peak violation. The gradient of the function with respect to the symbol magnitudes and phases is evaluated at the given symbol vector. Symbol perturbations are computed in the opposite direction of the gradient in such a way that the peaks are reduced and the amount of errors introduced in the symbols is not large enough to affect the decoding process. In order to reduce computation, a variant of the method is proposed where a peak reduction kernel is precomputed and stored. The kernel is rotated to the location of the peak and added with proper sign to reduce PAR.

7 Claims, 3 Drawing Sheets

TECHNIQUE FOR PEAK POWER TO AVERAGE POWER RATIO REDUCTION IN MULTICARRIER COMMUNICATION SYSTEMS

This application claims the benefit of Provisional application Ser. No. 60/101,744, filed Sep. 24, 1998.

FIELD OF INVENTION

This invention pertains to communication systems that employ a multitude of carriers for conveying information through a transmission medium. In particular, this invention addresses the problem of peak to average to power ratio reduction in such systems.

BACKGROUND OF THE INVENTION

A multicarrier transmission system is one that employs Frequency Division Multiplexed (FDM) subcarriers for transmission of data across a communication channel.

A typical multicarrier transmission system is depicted in FIG. 1. It shows serial data in the form of bits input to a serial to parallel converter 100, which also frames the bits. (A frame is an ordered sequence of bits of a given size). The output bit frame is mapped to symbols in the mapper 300. The frame of symbols then passes through the modulator 400. The modulation could be carried out, for instance, using Inverse Fast Fourier Transform (IFFT) and the corresponding demodulation carried out using Fast Fourier Transform (FFT). The modulated signal is converted to serial data (block 700) and transmitted on to the channel 900, where it suffers several impairments, in addition to being corrupted by noise. At the receiver, the received data is grouped into frames by a serial to parallel converter 1000 and subsequently passed through the demodulator 1100. The demodulated symbols are converted to bits through an inverse symbol mapper 1300, which also performs parallel to serial conversion.

The data bits input to the transmitter module are independent and the symbols obtained by the bits-to-symbol mapper are also independent. Whenever the number of subchannels is large, the modulator output magnitude tends to have a Gaussian distribution, which has an infinite peak to average power ratio. A clipper 800, which has a cutoff based on a predesignated clipping probability, is used to limit the peak signal power that is transmitted on to the channel. The clipping probability is kept low so that the error introduced due to clipping is small. But if the predesignated clipping probability is reduced, the increase in peak power may cause saturation in the subsequent amplification stages and intermodulation distortion due to nonlinearities in the transmission medium. Thus it becomes necessary to limit the peak power transmitted on to the channel by reducing the clipping level while still maintaining a low clipping probability.

FIG. 1 shows a peak detector 500 at the output of the modulator, which activates a symbol modifier 600 whenever the magnitude of any of the modulator output samples exceeds a predesignated threshold or set of thresholds. Although FIG. 1 shows the symbol modifier correcting the symbols that are being modulated, it is possible to achieve the same effect by correcting the modulated samples. The threshold could be set based on the level of peak power that can be transmitted on to the channel, while the task of the symbol modifier is to modify the symbols being modulated in such a manner that the peak is reduced. The symbol modifier needs to take care of a number of objectives:

1. The clipping probability should remain unaltered when the clipping threshold is lowered.
2. The loss in data rate caused due to symbol modification should be minimal.
3. A preferable requirement is that the symbol modifier should have a low complexity.
4. The PAR reduction scheme should be transparent to the receiver.
5. The modifications made to the data symbols should not cause an increase in the average subchannel powers.
6. The modifications introduced in the symbols should not cause significant increase in the error rate at the receiver end.

Most of the above requirements are conflicting and it may not be possible to meet all of them at the same time. The amount of importance given to each of these requirements by a particular method decides the amount of Peak to Average power Ratio (PAR) reduction achievable by that method.

Most of the prior art addresses several of the requirements listed above, but not all of them together. Some of the conventional methods use Peak Reduction Tones (PRT) (a predesignated set of subchannels) to reduce the PAR. One of the PRT methods is described by J. Tellado and J. Cioffi in "PAR Reduction in Multicarrier Transmission Systems (97-367)", T1E1.4/97-367 Dec. 8, 1997. It uses an iterative procedure which aims at reducing the largest peak every iteration. Another method is described by the same authors in "Revisiting DMT's PAR (98-083)", T1E1.4/98-083, Mar. 3, 1998. It uses an iterative procedure that tries to reduce all the peaks present during each iteration. Both the methods employ a precomputed peak reduction kernel. The reduction in PAR is obtained at the loss of several data carrying subchannels. PRT methods require that the receiver be aware of the predesignated subchannels to be used for peak reduction.

The modulo-D scheme described in "A new approach to PAR control in DMT Systems", NF-83, ITU-T, Study Group 15, 11–14 May 1998 uses an expanded constellation in each subchannel for PAR reduction. The method uses symbols drawn from larger constellations whenever the original modulation produces large peaks. The use of larger constellations results in increased average power and higher intermodulation distortion. The receiver will have to perform a reverse operation to the transmitter action to recover the original data symbols.

A sign inversion method has been specified in "An Efficient Implementation of PAR reduction method based on subset inversion", AB-061r2, ITU-T, Study Group 15, 3–7 August, 1998. It consists of dividing the set of subchannels into several subsets and achieving a PAR reduction by inverting the sign of the symbols in one or more of the subsets. The transmitter uses part of the data carrying bits to indicate to the receiver whether a sign inversion has been applied. This method requires receiver cooperation and results in data rate loss. Additionally, any error in a subset inversion indicator bit will result in incorrect decoding of data bits associated with that subset.

SUMMARY OF THE INVENTION

This invention proposes a peak-sensitivity based scheme for introducing modification(s) to the frame of data symbols, such that the PAR is reduced. The method employs a penalty function that assumes a non-zero value only when there is at least one sample whose magnitude exceeds a predetermined peak threshold. Whenever the penalty function becomes non-zero, a sensitivity-based scheme is proposed for computing the corrections to the transmit symbols. The amount of correction provided by the method is flexible. It is based on the tradeoff between the PAR reduction required and the error margin available for symbol decoding in individual subchannels at the receiver. The advantage of the proposed scheme is that the receiver need not have prior knowledge of the transmitter employing a PAR reduction mechanism. The receiver need not perform any extra action that reverses the effect of the transmitter action for achieving PAR reduction. No channels need to be specifically allocated for PAR reduction signals.

The advantage of the scheme proposed is that it satisfies requirements 1, 2, 3, 4 and 5 completely and allows for tradeoff in requirement 6 (in terms of compromise between PAR reduction and increase in symbol errors at the receiver). Several modifications to the proposed scheme are also suggested in order to reduce the computation overheads. The schemes involve usage of a precomputed peak kernel, which is scaled and rotated suitably such that the peaks are reduced. The main difference between the peak kernel proposed in this invention and the one used in prior art is that the proposed peak kernel could have non-zero values in all the subchannels. But the individual values in each subchannel are chosen to be small, so that negligible deterioration in SNR takes place at the receiver and there is little or no increase in error rate whenever peak correction is applied.

The salient features of the PAR reduction scheme proposed in this invention are:

1. The scheme modifies the transmit data frame to obtain PAR reduction, while having a small effect on the probability of error. The modifications could be performed on either the unmodulated or the modulated samples.
2. The scheme has low complexity and can be implemented efficiently.
3. The amount of PAR reduction can be traded off against increase in error rate.
4. The transmitter actions with respect to PAR reduction are totally transparent to the receiver, since the receiver actions for recovering the transmitted data remain unaltered by this scheme.
5. Modifications to the proposed scheme are also described, which reduce the computation while maintaining a good PAR reduction.

DETAILED DESCRIPTION OF THE INVENTION

The proposed scheme is applicable to multicarrier communication systems where the input data bits are converted to a symbol modulated by each subcarrier, modulated and transmitted on the channel. More generally, it is applicable to any system where the modulation and demodulation are performed at the frame (symbol) level. However, the ensuing description considers a multicarrier system employing IFFT and FFT for modulation and demodulation, respectively.

Figure 1:
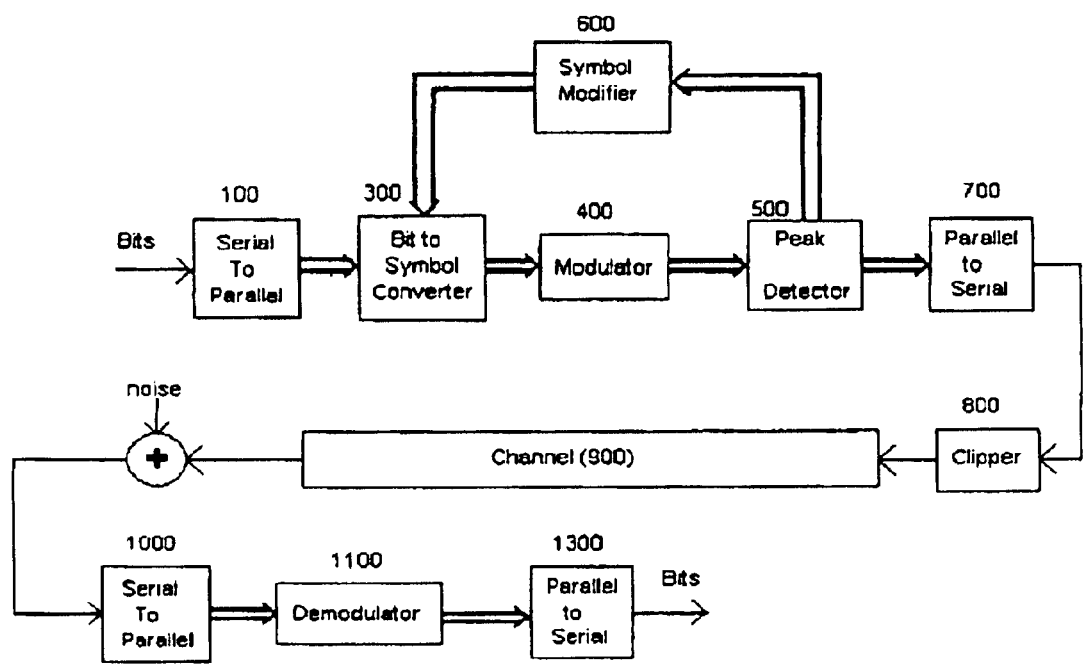
FIG. 1 is a block diagram of a typical multicarrier system that employs a forward error correction code.
Figure 2:
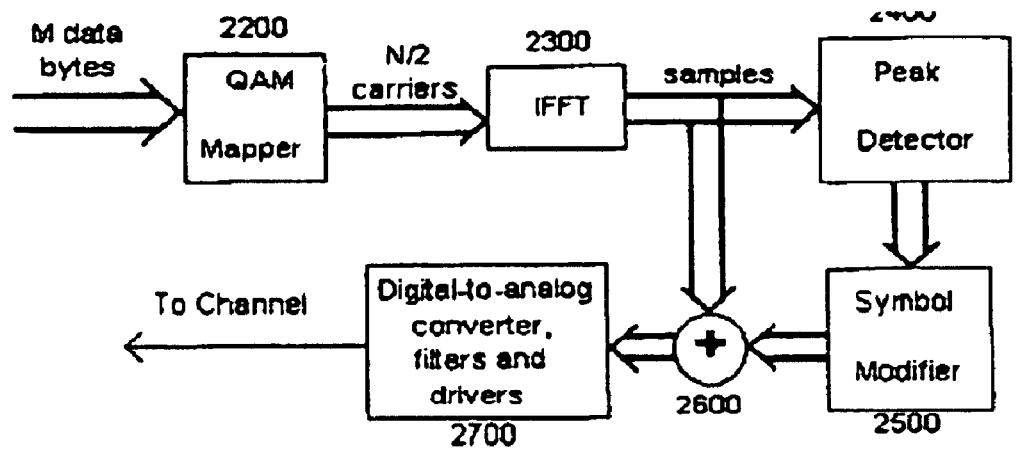
FIG. 2 is a block diagram of the proposed scheme.

A block schematic of the proposed method is shown in FIG. 2. The data frame of M bytes is mapped to symbols in block 2200 and modulated using the IFFT block 2300. It is assumed that the multicarrier system has N/2 channels. The output rate is assumed to be N samples per frame (i.e., the number of IFFT samples per frame is N).

The IFFT samples are passed through a peak detector 2400. The peak detection is carried out on the modulated samples using a predetermined threshold (or set of thresholds). The output of the peak detector activates the symbol modifier block 2500 whose output is added to the modulator output. This is finally passed through the Digital to Analog converter, filters and line drivers (represented in block 2700) and transmitted onto the channel.

The functions of peak detector and symbol modifier blocks are explained below.

The Peak Detector

The inputs to the peak detector are N samples of the IFFT. The peak detector uses a predesignated threshold T. The value of the threshold and the magnitude distribution of the samples together determine the probability of the number of samples whose magnitude exceeds the threshold. Thus the predesignated threshold T can be selected to control the number of samples violating the threshold. Each IFFT sample is compared with the threshold and the indices of samples whose magnitude exceeds the threshold are stored along with the amount by which they violate the threshold. This forms the input to the symbol modifier block.

The Symbol Modifier

This block determines the modification(s) to be made to the input symbols (or samples) such that the output of the symbol modifier reduces the PAR of the encoded frame. Below several schemes are disclosed of varying degrees of complexity. The clipping level is fixed based on the permissible error rate introduced by the transmitter module. In general, the clipping probability for a given threshold is small. In such a case, the probability of more than one sample being clipped in a frame is small compared to the probability of a single sample (peak) getting clipped.

Figure 3:
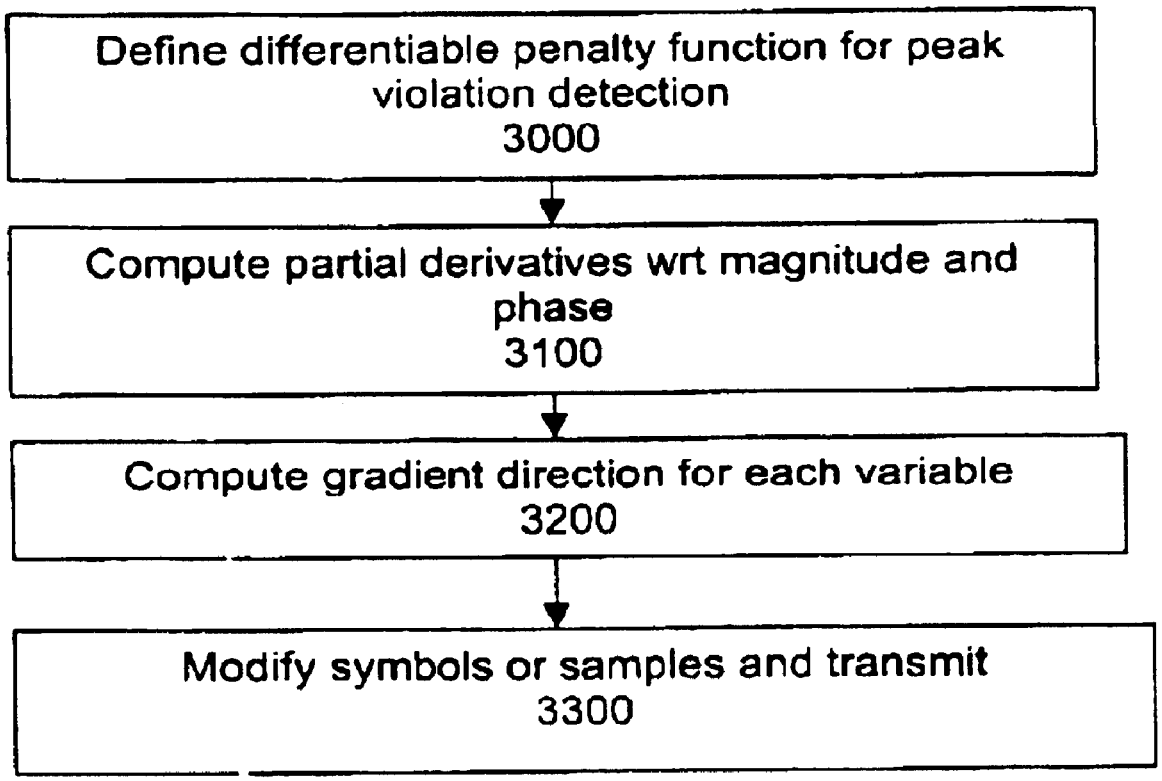
FIG. 3 is a flow diagram of the gradient sensitivity based PAR reduction method.

The gradient sensitivity based approach for computing the symbol modifier is now described (and depicted in FIG. 3). In this method, a differentiable penalty function is used to compute a measure of peak threshold violations (block 3000). Partial derivatives of the function with respect to subchannel symbol magnitudes and phase angles is computed to determine the sensitivity of the peaks with respect to the data symbols (block 3100). The gradient vector is used to compute the direction of variation of the symbol magnitudes and phases (block 3200). The optimal amount of variation in each direction can be computed using traditional optimization techniques, but the computation overhead for this operation can be very high. Further, the modifications suggested for the best possible PAR reduction can cause a large increase in the error rate, offsetting the gains obtained by performing PAR reduction. A compromise solution results by considering only the direction given by the gradient vector and making small modifications to a few symbols, such that the PAR is reduced (block 3300).

Denote the frame of data symbols by $X=(r_0, r_1 \exp(j\theta_1), r_2 \exp(j\theta_2), \ldots, r_{N/2-1} \exp(j\theta_{N/2-1}), r_{N/2})$, where $r_i$ and $\theta_i$ denote the magnitude and phase of symbol in channel i. Note that the dc value and Nyquist channels have real values. The IFFT operation yields time domain samples $x[k]$, $k=0,1,\ldots,N-1$; where $$x[k] = r_0 + 2\sum_{i=1}^{N/2-1} r_i \cos\left(\frac{2\pi ki}{N} + \theta_i\right) + r_{N/2}\cos(\pi k)$$

The outputs of the peak detector are the locations where the IFFT sample magnitudes violate the threshold T and the extent of the violation. Thus, for a sample $x[k]>T$, the violation is indicated as $(x[k]-T)$, while it is $(x[k]+T)$ if $x[k]+T<0$. The following penalty function is used for each point $x[k]$ that violates the threshold T.

$$h(x[k]) = \begin{cases} (x[k] - T)^{2m} & \text{if } x[k] \geq T \\ 0 & \text{if } |x[k]| \leq T \\ (x[k] + T)^{2m} & \text{if } x[k] \leq -T \end{cases}$$

where m is a positive integer that decides the severity of penalty. In the preferred embodiment, we have taken m to be unity in order to minimize computation. Denoting the vector $(x[0], x[1], \ldots, x[N-1])$ by x, the net penalty function $f(x)$ is computed as the sum of the individual penalty functions, i.e., $$f(x) = \sum_{k=0}^{N-1} h(x[k])$$

Although the summation is indicated over all possible indices, the sum will comprise only of the non-zero values corresponding to each peak violation. The proposed sensitivity based method involves computation of partial derivatives of f(x) with respect to each magnitude and phase angle.

$$\frac{\partial f}{\partial r_i} = \sum_{k=0}^{N-1} \frac{dh(x[k])}{dx[k]} \cos\left(\frac{2\pi k i}{N} + \theta_i\right); i \in \{1, \ldots, N/2 - 1\}$$

$$\frac{\partial f}{\partial r_0} = \sum_{k=0}^{N-1} \frac{dh(x[k])}{dx[k]}; \frac{\partial f}{\partial r_{N/2}} = \sum_{k=0}^{N-1} \frac{dh(x[k])}{dx[k]} \cos(\pi k)$$

$$\frac{\partial f}{\partial \theta_i} = -r_i \sum_{k=0}^{N-1} \frac{dh(x[k])}{dx[k]} \sin\left(\frac{2\pi k i}{N} + \theta_i\right); i \in \{1, \ldots, N/2 - 1\}$$

Note that when m=1, the derivative of h(.) corresponds to the amount by which a peak threshold is violated. The objective of locally minimizing the multi-modal penalty function f(.) is computationally expensive. Global minimization of f is not feasible since the resulting symbol modification may correspond to excessive amount of noise being added to the symbol. In order to obtain a good PAR reduction with a small amount of computation, the following strategy is employed. The negative direction of the gradient corresponds to reduction of PAR. Also note that even a small variation in a parameter for which the corresponding term in the gradient vector has large magnitude, causes a larger reduction in the peak value. Further, if the requirement of not altering the frame power has to be satisfied, only the phase angles can be changed. The amount of variation in symbol phases and/or magnitudes should be such that it causes minimal deterioration in the SNR of the received symbols. Keeping this in mind, a small fraction ($\delta$) of each variable could be kept as the limit of change. The first procedure involves changing the symbol values by small values to effect a peak reduction.

The pseudo code for the procedure is given below:
Procedure 1
1. Determine the values $\delta_0, \delta_1, \ldots, \delta_{N/2}$ by which the symbols in each subchannel can be changed. (The change may have amplitude and phase components.)
2. Compute the gradient vector as mentioned above.
3. Apply a correction to the input vector in the opposite direction of the gradient. The amount of correction is limited to the value of $\delta_i$ for each subchannel.
4. Repeat steps 2–3 if required.
5. Remodulate the changed symbols and transmit the modified samples.

Figure 4:
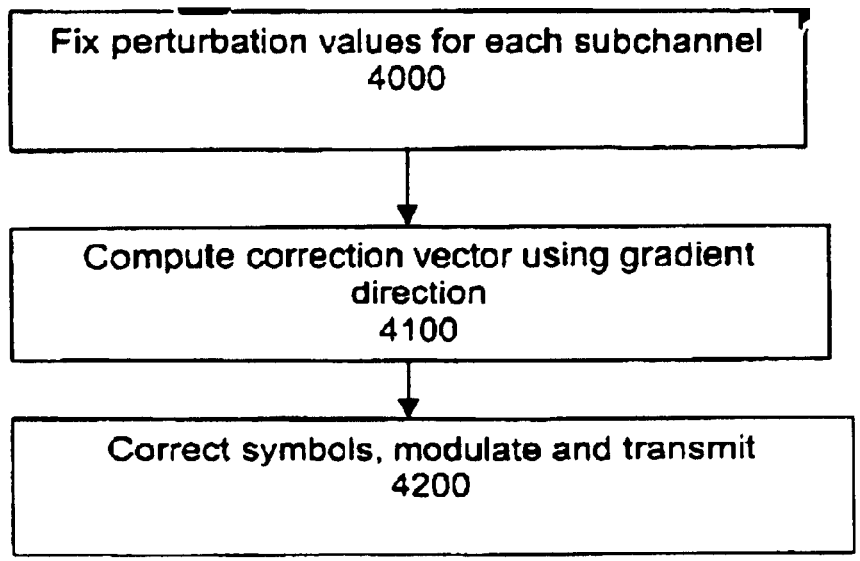
FIG. 4 depicts an iteration of Procedure 1.

Procedure 1 is depicted in FIG. 4. The values of perturbations for each symbol are determined (block 4000). The correction to the symbols is computed by using the direction of the gradient vector (block 4100). The symbols are modified by this correction, modulated and transmitted on to the channel (block 4200).

The values for $\delta_1$ depend upon the bit to symbol mapping scheme. For example, consider a 4-point constellation with points (1,1), (1,–1), (–1,–1) and (–1,1). The inter-point distance is 2 on each axis. Hence the maximum value of $\delta_i$ is 1 on each axis so that the modified symbol is not mistaken for some other point. In practice, $\delta_i$ is chosen as a fraction of the interpoint distance so that the SNR in the particular subchannel is not degraded too much. For the value of $\delta_1$ chosen, the decrease in the SNR in the subchannel i at the receiver side can be computed based on the clipping probability and the average constellation power. It is clear that the deterioration in the SNR in the ith subchannel at the receiver is more when corrections are applied more frequently (i.e., T is small and the clipping probability is large) or if $|\delta_i|$ is large. Thus the values of $|\delta_1|$ and T can be chosen based on the tradeoffs between PAR reduction and SNR deterioration in each subchannel on the receiver side. If the gradient with respect to only the phase angles is computed and used in procedure 1, the power of the transmit symbol frame remains unaltered.

If the correction magnitudes are chosen to be large, it is possible that new peaks might result while correcting for the existing peaks. In such cases, the corrections can be repeatedly applied as indicated in Procedure 1. However, iterative correction needs repeated computation of the gradient vector and additional care to avoid repeated and excessive correction in the same subchannel. The gradient computation is also computationally expensive. An alternative procedure, which does not need gradient computation and uses a pre-computed peak reduction kernel to compensate for a single peak, is now described.

Procedure 2
1. Determine the values $\delta_i$ as in procedure 1.
2. Compute the peak reduction kernel as the IFFT of vector of $\delta_i$ values in each subchannel.
3. Rotate the peak reduction kernel by an amount such that its peak coincides with the peak of the output frame. Multiply the peak reduction kernel by –1 if its peak has the same sign as the frame peak.
4. Add the rotated, possibly sign-inverted peak reduction kernel to the output frame samples.
5. Transmit the modified samples.

Figure 5:
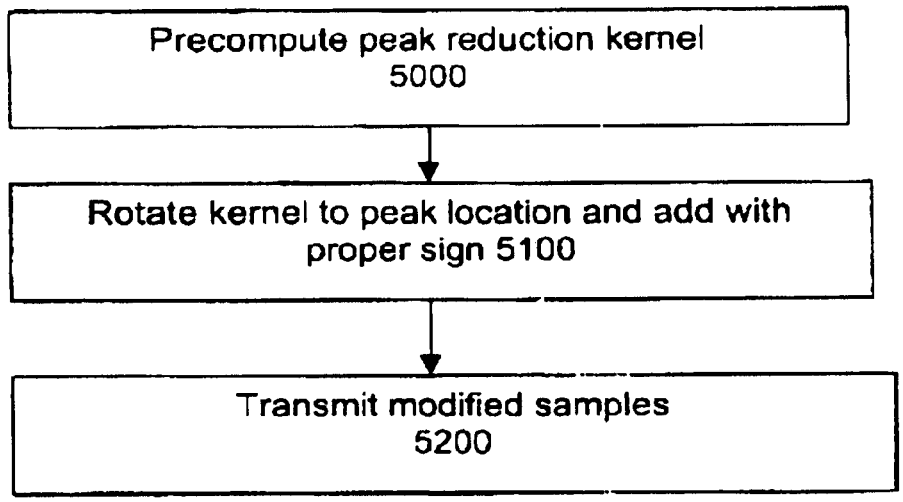
FIG. 5 describes Procedure 2.

Procedure 2 is depicted in FIG. 5. The perturbation values are fixed and the peak reduction kernel computed (block 5000). Whenever a peak is detected, the kernel is rotated to the location of the peak and added with proper sign (block 5100). The modified data is transmitted on to the channel (block 5200).

The peak reduction kernel is computed as follows.

The $\delta_i$ values consist of an amplitude and a phase component. The phase component of each $\delta_1$ may be set to zero. This ensures that the peak reduction kernel has its peak value at the first sample and that the magnitude of the peak is the maximum attainable using the chosen set of $\delta_i$ values. The rotation of the peak reduction kernel to coincide with a chosen peak of the data frame corresponds to rotation of the input $\delta_i$ sample by an angle proportional to i.

Multiple peaks are handled in the following manner. For each IFFT sample that violates the threshold T, the peak reduction kernel is rotated as described in procedure 2 to coincide with that peak location. Each rotated kernel is scaled by a factor which is a function of the extent of peak violation. The scaling factors are chosen such that the sum of their magnitudes is 1. This ensures that the noise power thus added is limited.

The preferred embodiment involves use of an IFFT for modulation. Any alternate means of frame (symbol) based QAM modulation may also be used. This could also include PAM and DPSK modulation.

The preferred embodiment uses symmetric, 2-dimensional constellations for mapping bits to symbols. The procedure also applies to any subset of the 2-dimensional constellation or multi-dimensional constellations.

The symbol modification can be applied to its phase or amplitude or both.

Several of the modules can be implemented in hardware or software.

The preferred embodiment used a specific penalty function that is the summation of even powers of each peak violation. Instead of simple summation, suitably weighted summation can be used. More generally, the penalty function itself may be different.

The gradient directions for single peak occurrences can be pre-computed and stored. The computation requirement in this case reduces to one of finding a weighted sum of the directions for each peak.

Several other heuristics known to those of ordinary skill in the art can be used to compute the peak reduction kernel of procedure 2 and are considered to be within the scope of the present invention.

What is claimed is:

1. In a multicarrier communication system in which a signal to be transmitted comprises data bits to be converted into a symbol modulated by each subcarrier of the signal prior to transmission on a channel, a method for minimizing a peak to average power ratio while minimizing introduction of errors into the signal to be transmitted, comprising:

sampling the symbols to be transmitted of a frame;

compare magnitudes of the samples of the frame to a predetermined threshold to determine whether sample magnitudes in the frame violate the predetermined threshold, the predetermined threshold being selectable to control the number of samples violating the threshold;

responsive to determining a sample magnitude does violate the predetermined threshold, applying a differentiable penalty function to the samples having magnitudes exceeding the predetermined threshold;

computing a net penalty function value, the net penalty function value responsive to the individual penalty function values computed for the samples having magnitudes exceeding the predetermined threshold;

computing a gradient vector responsive to the net penalty function value;

determining a direction of the gradient vector;

determining an upper limit correction value for each symbol, the upper limit correction value being selectable to control an amount of signal to noise ratio deterioration;

applying a correction to the symbols to be transmitted in a direction opposite to the direction of the gradient vector, the magnitude of the correction not exceeding the determined correction values for each symbol; and transmitting the corrected symbols to the channel.

2. The method of claim 1 wherein determining an upper limit correction value for each symbol, further comprises:

computing an interpoint distance between symbols;

selecting a correction value for a symbol as a value less than the interpoint distance to ensure that the symbol is not mistaken for other symbols.

3. The method of claim 1 wherein applying a differentiable penalty function to the samples having magnitudes exceeding the predetermined threshold comprises: applying the function:

$$h(x[k]) = \begin{cases} (x[k] - T)^{2m} & \text{if } x[k] \\ 0 & \text{if } |x[k]| \\ (x[k] + T)^{2m} & \text{if } x[k] \leq \end{cases}$$

where m is a positive integer that decides the severity of penalty, T is the predetermined threshold, x is the frame of data symbols expressed by: $X=(r_0, r_1 \exp(j\theta_1), r_2 \exp(j\theta_2), \ldots, r_{N/2-1} \exp(j\theta_{N/2-1}), r_{N/2})$, where $r_i$ and $\theta_i$ denote the magnitude and phase of symbol in channel i, and k is the number of the symbol.

4. The method of claim 3 wherein the net penalty function comprises:

$$f(x) = \sum_{k=0}^{N-1} h(x[k])$$

5. The method of claim 4, wherein the gradient vector is computed as:

$$\frac{\partial f}{\partial r_i} = \sum_{k=0}^{N-1} \frac{d h(x[k])}{dx[k]} \cos\left(\frac{2\pi k i}{N} + \theta_i\right); i \in \{1, \ldots, N/2 - 1\}$$

$$\frac{\partial f}{\partial r_0} = \sum_{k=0}^{N-1} \frac{d h(x[k])}{dx[k]}; \frac{\partial f}{\partial r_{N/2}} = \sum_{k=0}^{N-1} \frac{d h(x[k])}{dx[k]} \cos(\pi k)$$

$$\frac{\partial f}{\partial \theta_i} = -r_i \sum_{k=0}^{N-1} \frac{d h(x[k])}{dx[k]} \sin\left(\frac{2\pi k i}{N} + \theta_i\right); i \in \{1, \ldots, N/2 - 1\}$$

6. The method of claim 1 wherein the gradient vector is computed only as a function of the magnitude of the sample values.

7. The method of claim 1 wherein computing a net penalty function value comprises adding together the individual penalty function values computed for the samples having magnitudes exceeding the predetermined threshold to generate the net penalty function value.

* * * * *